United States Patent
Flores

(10) Patent No.: US 11,722,402 B2
(45) Date of Patent: Aug. 8, 2023

(54) SYSTEMS AND METHODS FOR PREEMPTIVE DETECTION AND CORRECTION OF NETWORK ISSUES BASED ON CONTROL PLANE MESSAGING

(71) Applicant: Edgio, Inc., Phoenix, AZ (US)

(72) Inventor: Marcel Eric Schechner Flores, Los Angeles, CA (US)

(73) Assignee: Edgio, Inc., Phoenix, AZ (US)

( * ) Notice: Subject to any disclaimer, the term of this patent is extended or adjusted under 35 U.S.C. 154(b) by 169 days.

(21) Appl. No.: 17/386,789

(22) Filed: Jul. 28, 2021

(65) Prior Publication Data
US 2023/0035359 A1    Feb. 2, 2023

(51) Int. Cl.
| | |
|---|---|
| H04L 45/28 | (2022.01) |
| H04L 45/02 | (2022.01) |
| H04L 43/062 | (2022.01) |
| H04L 45/302 | (2022.01) |
| H04L 45/745 | (2022.01) |
| H04L 45/021 | (2022.01) |

(52) U.S. Cl.
CPC ............ *H04L 45/28* (2013.01); *H04L 43/062* (2013.01); *H04L 45/021* (2013.01); *H04L 45/04* (2013.01); *H04L 45/304* (2013.01); *H04L 45/745* (2013.01)

(58) Field of Classification Search
CPC ..... H04L 45/28; H04L 43/062; H04L 45/021; H04L 45/04; H04L 45/304; H04L 45/745
See application file for complete search history.

(56) References Cited

U.S. PATENT DOCUMENTS

| | | | |
|---|---|---|---|
| 10,063,405 B2 * | 8/2018 | Shibata | H04L 41/0631 |
| 2018/0199219 A1 * | 7/2018 | Kim | H04W 24/08 |
| 2022/0294820 A1 * | 9/2022 | Koral | H04L 63/205 |

* cited by examiner

*Primary Examiner* — Kibrom T Hailu
(74) *Attorney, Agent, or Firm* — Greenberg Traurig, LLP; Andrew J. Tibbetts

(57) ABSTRACT

Provided is a Routing Early Warning System ("REWS") that preemptively detects and corrects network issues based on control plane messaging. REWS receives control plane messages for network paths to a source node, groups the control plane messages to different bins based on time, detects an anomaly based on a number of a first set of control plane messages grouped to a particular bin differing, by a threshold amount, from a steady state number of control plane messages grouped to at least one other bin, and isolates a cause of the anomaly based on a number of updated paths and addressing of one or more nodes specified in the first set of control plane messages. REWS modifies routing of the source node data plane traffic before the anomaly significant impacts the data plane in response to detecting the anomaly and isolating the anomaly cause using the control plane messages.

20 Claims, 7 Drawing Sheets

SYSTEMS AND METHODS FOR PREEMPTIVE DETECTION AND CORRECTION OF NETWORK ISSUES BASED ON CONTROL PLANE MESSAGING

BACKGROUND

Network nodes may rely on their own network equipment and the network equipment of network peers, transit providers, Internet Service Providers ("ISPs"), and/or other third parties to deliver network traffic to and from other network nodes. An issue that affects the network equipment operated by a particular network node (e.g., a router failure) may be directly resolved as a result of having access to that network equipment. However, as is often the case, the failure is not detected by the particular network node until the data plane is impacted by way of degraded performance, inaccessible services, and/or lost traffic. Failure in the network equipment managed by third parties may have similar impacts to the delivery of the network traffic to and from the particular network node. In such instances, the particular network node may detect a remote issue only after that failure has resulted in dropped data packets or other impacts to the data plane. The particular network node may indirectly resolve the remote issue by rerouting the data plane traffic through different network paths. In any case, by the time the network issue is detected from the impacts to the data plane and by the additional time needed to correct the network issue, the particular network node may experience an extended outage or service disruption.

DETAILED DESCRIPTION OF PREFERRED EMBODIMENTS

The following detailed description refers to the accompanying drawings. The same reference numbers in different drawings may identify the same or similar elements.

Disclosed is a Routing Early Warning System ("REWS") and methods for preemptively detecting and correcting network issues based on control plane messaging. REWS may receive control plane messaging from various Autonomous Systems ("ASes") and/or other Network Service Providers ("NSPs"), may preemptively detect various network issues based on anomalies in the control plane messaging counts and/or patterns that originate from the various ASes and/or NSPs, and may implement various corrective actions to prevent packet loss, performance degradation, and/or service interruption prior to the detected network issues having a large impact on the data plane (e.g., the routing of network traffic).

The control plane messages may include Border Gateway Protocol ("BGP") announcements and/or other route or path updates that routers from different ASes and/or NSPs provide to neighboring routers. The control plane messages may identify the network address prefixes that each AS or NSP has a path to, the ordered sequence AS numbers for reaching those network address prefixes, and/or other meta-information associated with the paths. The network address prefixes may include sites or nodes of content provider networks, Content Delivery Networks ("CDNs"), Internet Service Providers ("ISPs"), and/or other network-accessible devices.

Based on the exchanged control plane messages, each router may construct and maintain a local state of which prefixes it has connectivity to in its Routing Information Base ("RIB"). As each router receives new control plane messaging from neighboring routers, the router may update its RIB for any path changes, and may generate additional control plane messages to updates its neighbors of the path changes.

Collectors may include network devices that receive the control plane messages from the routers of various ASes and/or NSPs. REWS may interface with the collectors, and may compile and analyze the aggregated control plane messages from the controllers in order to model announcement behavior and/or activities of different ASes and/or NSPs that originate the control plane messages, the peers they announce to, and the intermediate networks between the originating AS and/or NSP and the collectors. From the modeling, REWS may detect anomalies that originate in the control plane, and may perform corrective actions before those anomalies begin to impact the data plane and/or create significant disruption in the data plane.

Figure 1:
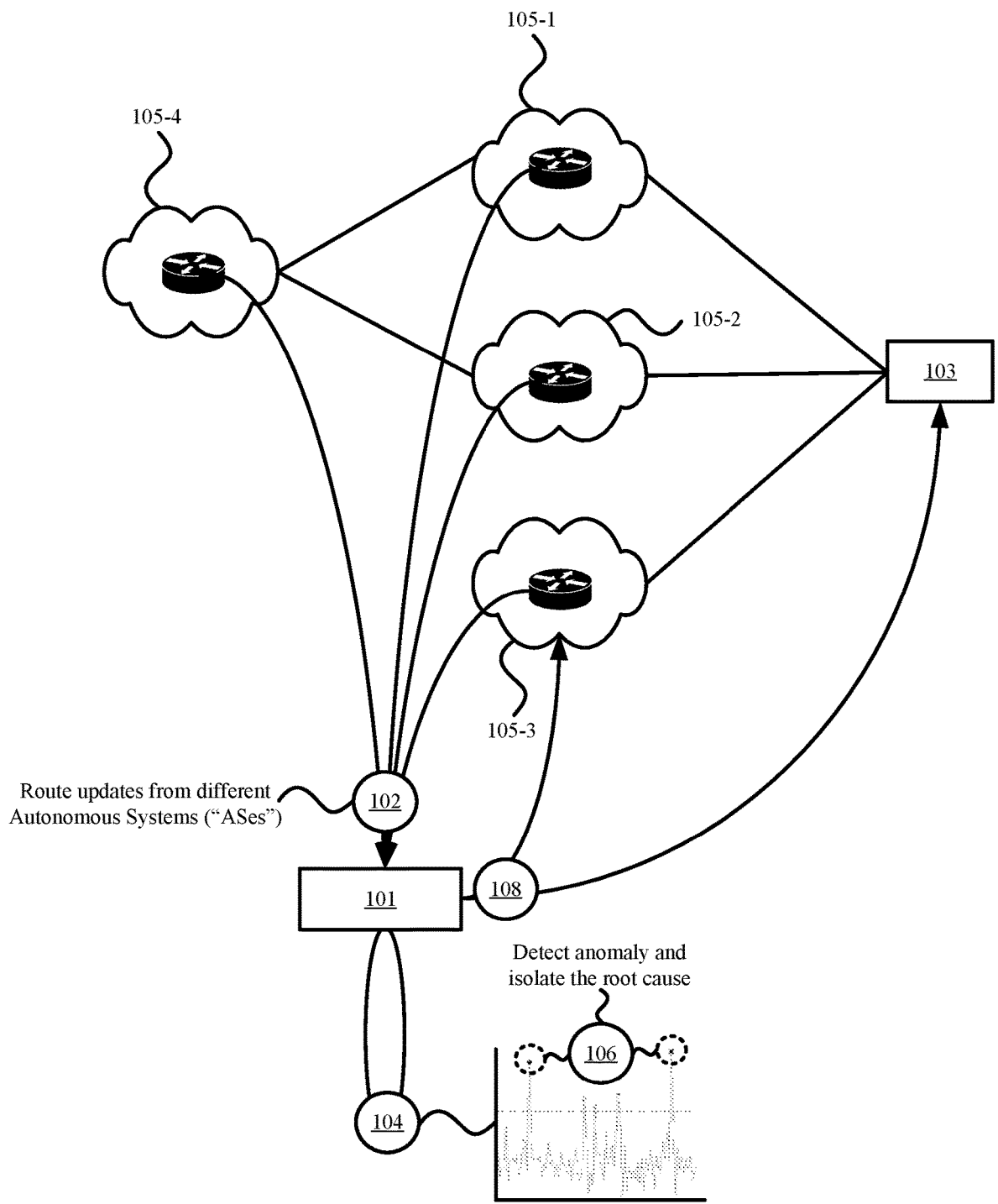
FIG. 1 illustrates an example of using control plane messaging for preemptive detection and correction of network issues in accordance with some embodiments presented herein.

FIG. 1 illustrates an example of using control plane messaging for preemptive detection and correction of network issues in accordance with some embodiments presented herein. In FIG. 1, REWS 101 may be configured to monitor the control plane messages for network issues that may impact source node 103 or any of the network paths carrying the data plane traffic to and from source node 103, and to adaptively switch the routing of that data plane traffic in response to any detected network issues.

REWS 101 may receive and/or monitor (at 102) the control messages from ASes 105-1, 105-2, 105-3, and 105-4 (herein sometimes collectively referred to as "ASes 105", or individually referred to as "AS 105"). In particular, REWS 101 may monitor (at 102) for control messages that are caused by source node 103 or that identify potential issues or changes for reaching source node 103 via ASes 105.

Source node 103 may include a network site, device, and/or endpoint that sends and/or receives network traffic from various other network nodes, equipment, sites, and/or devices over network paths established through ASes 105. In some embodiments, the control messages may include BGP announcements and/or other route update messages that are originated by source node 103 and/or by routers of ASes 105, and that REWS 101 indirectly receives (at 102) from one or more collectors. In some other embodiments, REWS 101 may operate as a peer of ASes 105 peer or may assume the function of a collector in order to directly receive (at 102) the BGP announcements and/or route update messages from the AS 105 routers.

REWS 101 may model (at 104) the behavior and/or activities of ASes 105 based on the number and/or pattern of announcements originating from each AS 105 over different time intervals. For instance, the modeling (at 104) may include tracking the number of announcements originating from each AS in one-minute intervals over a period of several days, and determining the average frequency or range of updates originating from ASes 105 when the paths have reached and/or operate at a steady state (e.g., paths receive regular or expected changes).

REWS 101 may detect (at 106) anomalies in the modeled (at 104) behavior and/or activities of ASes 105. The anomalies may correspond to spikes in the number of announcements originating from one or more ASes 105 in certain time intervals. The spikes in the control plane messages may be precursors of network issues that may disrupt or otherwise impact the data plane for the network paths identified in the announcements and/or for the network nodes reachable via the address prefixes identified in the announcements.

In some embodiments, detecting (at 106) an anomaly may include isolating the root cause of that anomaly based on the network paths, address prefixes, and/or ASes 105 identified in the spike of control plane messages. For instance, an announcement spike that originates from third AS 105-3 and/or that updates paths of third AS 105-3 may indicate that a router or other network equipment in third AS 105-3 is exhibiting anomalous behavior, and may be isolated to third AS 105-3. As another example, two or more ASes 105 may be responsible for an announcement spike (e.g., the increase in BGP announcements may originate from the two or more ASes 105), and the announcements from the two or more ASes 105 may include paths or address prefixes back to source node 103. Such an anomaly may result when source node 103 becomes unreachable or connectivity to source node 103 has changed, and each AS 105 may issue route updates to indicate that source node 103 is unreachable.

In response to detecting (at 106) the anomaly, REWS 101 may perform (at 108) corrective actions to mitigate the disruption to the data plane. The corrective actions may include pulling or withdrawing certain announcements from source node 103 and/or ASes 105, modifying routing policies that control the path selection at source node 103, changing routing tables, and/or otherwise affecting the routing of traffic to and from source node 103.

In some embodiments, REWS 101 may perform (at 108) different corrective actions for inbound traffic to source node 103 and for outbound traffic from source node 103. For instance, outbound traffic from source node 103 over the one or more network paths of AS 105-1 may be shifted to network paths of another AS 105 by changing the routing table of a source node 103 router, and inbound traffic flowing over the one or more network paths of AS 105-1 to source node 103 may be shifted to network paths of another AS 105 by modifying the control plane messages (e.g., announcements) coming from AS 105-1 and/or other ASes 105.

REWS 101 may select between different corrective actions to perform based on the isolated root cause of the anomaly. In the event of an isolated anomaly at third AS 105-3, REWS 101 may perform (at 108) a corrective action to prioritize the routing of data plane traffic from source node 103 through first AS 105-1 or second AS 105-2 instead of third AS 105-3. In the event of an isolated anomaly at source node 103, REWS 101 may pull announcements from source node 103 so that traffic intended for source node 103 is routed to an alternate node where the same content, services, and/or data may be accessed. For instance, source node 103 may be a first Point-of-Presence ("PoP") of a CDN that is exhibiting signs of instability, and REWS 101 may shift the traffic from the first PoP to a second PoP of the CDN that is operating normally.

By monitoring the control plane messaging, REWS 101 may be able to detect network issues before they result in significant disruption on the data plane, or may be able to detect the network issues sooner than if monitoring for anomalies on the data plane. For example, a router may have multiple line cards with each line card associated with a different path. One line card may fail. The router may attempt to shift the traffic from the failing line card to other line cards, and may issue BGP announcements to identify the path change for the shifted traffic. The shifted traffic may initially flow through the other line cards and/or network paths with no abnormal packet loss, latency, and/or other data plane impact. However, the other paths may become congested over time due to the shifted traffic, and may then exhibit an impact on the data plane well after the anomalous behavior occurred in the control plane. As another example, a router along a path connecting to source node 103 may begin to flap and periodically reset. The flapping may degrade performance along the path, but the path may remain operational for different periods of time. Accordingly, source node 103 may experience greater latency and/or packet loss that remain within acceptable level, and may therefore continue sending traffic through that path. By analyzing the control plane messages, REWS 101 may be able to determine that one or more routers along the path are exhibiting anomalous behavior and that the anomalous behavior is indicative of or a precursor for the path going offline. REWS 101 may perform the corrective action to shift the data plane traffic off of the path before the data plane traffic is further affected, and/or before the issue on the control plane fully manifests on the data plane.

Figure 2:
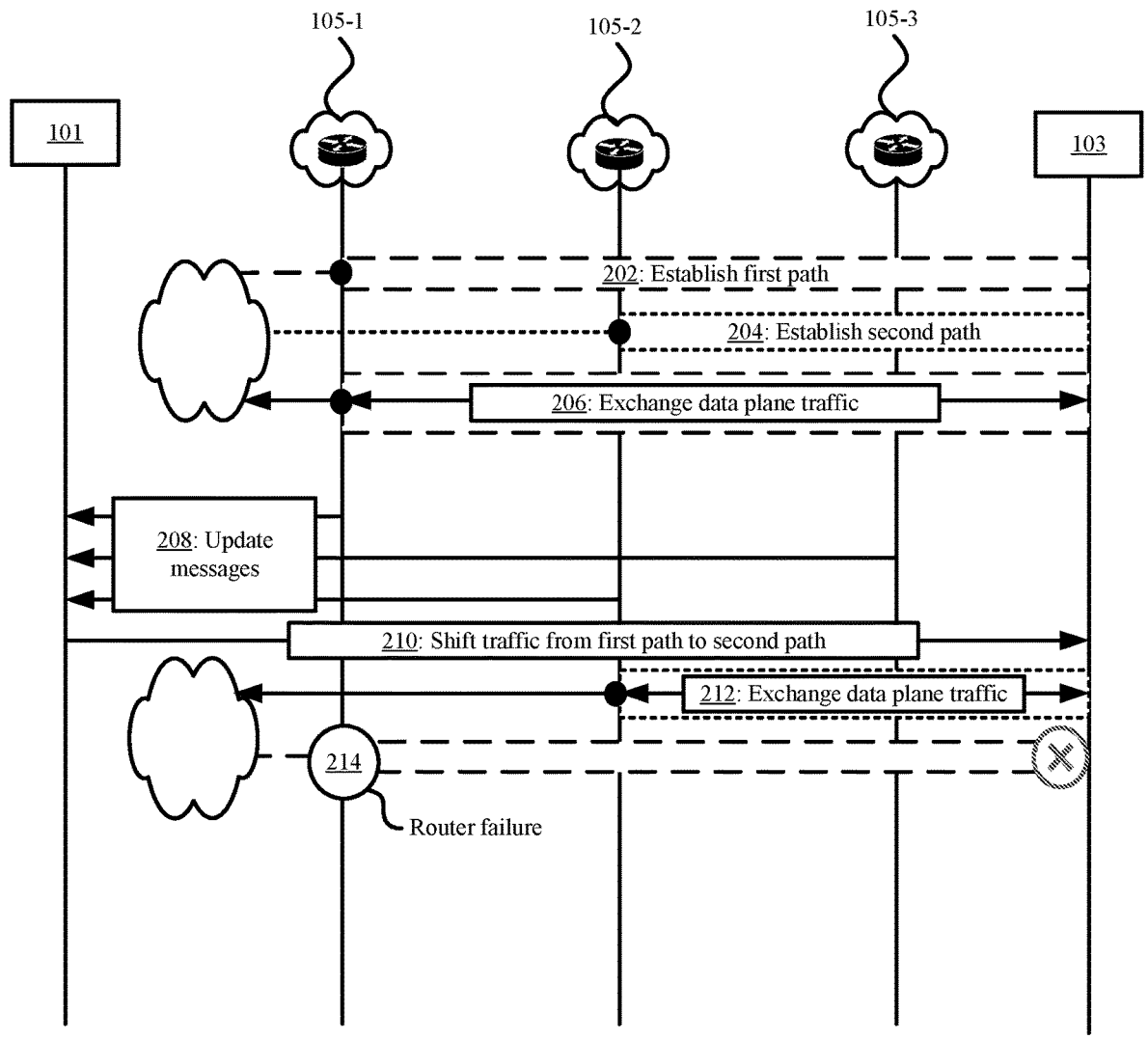
FIG. 2 illustrates an example of using the control plane messaging to detect network issues before the network issues significantly impact the data plane in accordance with some embodiments presented herein.

FIG. 2 illustrates an example of using the control plane messaging to detect network issues before the network issues significantly impact the data plane in accordance with some embodiments presented herein. As shown in FIG. 2, source node 103 may peer with first AS 105-1, and/or may establish (at 202) a first path for ingress and egress traffic through first AS 105-1. Source node 103 may also peer with second AS 105-2, and/or may establish (at 204) a second path for ingress and egress traffic through second AS 105-2. In some embodiments, the first path and the second path may include third AS 105-3 as a transit provider and/or pass-through network links that are operated by third AS 105-3. In some other embodiments, the first path and the second path may bypass third AS 105-3.

The first path and the second path may reach the same set of external nodes, equipment, sites, and/or devices in a public network (e.g., the Internet) or a private network. Nonetheless, the first path and the second path may include different network links or hops by which source node 103 exchanges data with those external nodes, equipment, sites, and/or devices.

Source node 103 may initially exchange (at 206) data with a set of external nodes via the first path through first AS 105-1 due to a routing policy that prioritizes the first path over the second path. For instance, the routing policy may identify the first path as a shorter path (e.g., fewer hops or less latency) than the second path for reaching the set of external nodes. Alternatively, the routing policy may prioritize the first path over the second path because of a peering arrangement with first AS 105-1, cost, reliability, and/or other factors.

REWS 101 may receive (at 208) update messages or route announcements from the one or more routers of first AS 105-1, second AS 105-2, and/or third AS 105-3. REWS 101 may analyze the update messages, may detect that the number of update messages or route announcements originating from first AS 105-1, include the first path, and/or include address prefixes for source node 103 is abnormal or divergent from a previous pattern. Specifically, REWS 101 may determine from the abnormal announcements originating from first AS 105-1 and the normal announcements originating from the other ASes (i.e., second AS 105-2 and third AS 105-3) that the issue is likely caused by network equipment in the first AS 105-1 and/or hops along the first path but not the second path. For instance, a router of first AS 105-1 may become overloaded, experience flapping, be misconfigured, experience power disruptions, and/or other issues that degrade the routing performance and/or operation of that router.

REWS 101 may perform (at 210) a corrective action to resolve or avoid the detected issue before the detected issue causes significant disruption on the first path and the data plane with which source node 103 exchanges data with the set of external nodes. The corrective action may include modifying the routing policy at source node 103 so that the traffic is shifted from the first path over to the second path, thereby bypassing first AS 105-1 where the issue is detected. Accordingly, in response to the corrective action, source node 103 may transition the data plane traffic from the first path over to the second path, and may exchange (at 212) the data plane traffic with the set of external nodes using the second path.

Shortly after performing (at 210) the corrective action, the router of first AS 105-1 may fail (at 214) and/or may be temporarily deactivated. For instance, the router of first AS 105-1 may be unable to recover from overloading, flapping, misconfiguration, power disruptions, and/or other issues, and may stop routing traffic altogether. Alternatively, an administrator of first AS 105-1 may detect the router's anomalous behavior, and may reset the router, restore a prior router configuration, or take the router offline for maintenance. Each of these actions may cause a significant disruption to the flow of data plane traffic across the first path, wherein the disruption may include significant packet loss or added latency as the data packets are rerouted through less optimal or more congested paths. However, the corrective actions performed (at 210) by REWS 101 may precede the more significant or prolonged disruption to the first path, thereby mitigating or minimizing the disruption to the data plane traffic of source node 103 and/or the ability of the external set of nodes to access source node 103.

Figure 3:
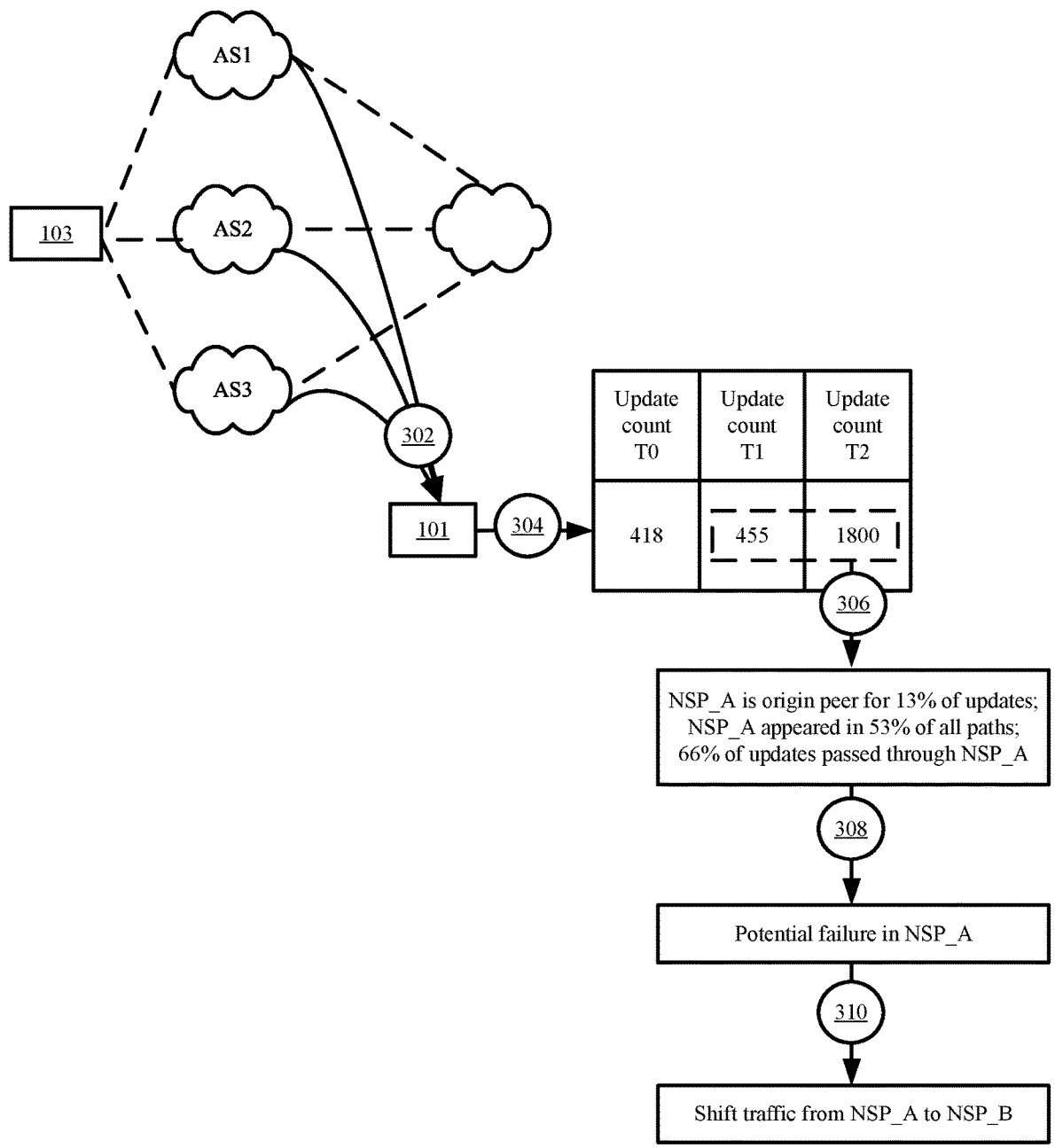
FIG. 3 illustrates an example of isolating a network issue to a particular network or path based on aggregated control plane messages in accordance with some embodiments presented herein.

FIG. 3 illustrates an example of isolating a network issue to a particular network or path based on aggregated control plane messages in accordance with some embodiments presented herein. As shown in FIG. 3, REWS 101 may receive (at 302) control plane messages directly from various peers, carriers, ASes, and/or providers. Alternatively, REWS 101 may receive (at 302) the control plane messages indirectly from one or more network collectors that establish BGP sessions with those peers, carriers, ASes, and/or providers.

REWS 101 may model (at 304) the rate and/or frequency of the control plane messages by grouping the control plane messages based on time. In some embodiments, each control plane message may include a timestamp for the time at which that message was generated, and REWS 101 may group the control plane messages based on the origination time. In some other embodiments, a control plane message may include a timestamp for the time at which that message was received by a peer, neighbor, and/or network collector, and REWS 101 may group the control plane messages based on the time at which those messages were received.

REWS 101 may detect (at 306) an anomaly in the modeled pattern. In particular, REWS 101 may detect (at 306) an anomalous group within the modeled pattern. REWS 101 may detect (at 306) the anomalous group by comparing the control plane message counts of different groups (e.g., from different time bins), and by determining that one or more of the message counts (e.g., one group) deviates from the other message counts (e.g., other groups) by some threshold amount or percentage.

REWS 101 may inspect the control plane messages from the anomalous group in order to isolate (at 308) the root cause for the anomalous behavior or activity. The inspection may include determining the one or more networks, ASes, or addresses from which the increased control plane messages originate, and/or commonality in the paths identified in the increased control plane messages. In some embodiments, isolating (at 308) the root cause may include localizing the fault to a particular network, AS, or network path. In some embodiments, isolating (at 308) the root cause may include determining the upstream path where the anomaly occurred or originated.

As shown in FIG. 3, REWS 101 may isolate (at 308) the root cause by determining that a particular transit provider (i.e., "NSP_A") is an origin peer for 13% of the control plane messages, that the particular transit provider appears in 53% of all paths found in the control plane messages, and that 66% of the control plane messages passed through the particular transit provider, wherein the origin peer is a network that appears adjacent to the route's origin network. In other words, the majority of the control plane messages involve one or more paths of the particular transit provider with those changes propagating into the control plane messages that originate from other peers, ASes, transit providers, and/or sources. From this analysis, REWS 101 may isolate (at 308) the anomalous behavior to the particular transit provider and/or one or more paths of the particular transit provider, and may further predict, with a high probability, that a potential failure may occur on the one or more paths of the particular transit provider based on the networks, ASes, or addresses within the increased number of control plane messages.

REWS 101 may take (at 310) corrective action to shift off or away from the particular transit provider, and to move the shifted data plane traffic through a path that bypasses the particular transit provider or paths of the particular transit provider, and that routes through paths of another transit provider, AS, and/or peer. The corrective action may include adjusting routing policies, routing tables, route advertisements and/or announcements, Domain Name System ("DNS") records, and/or other traffic engineering parameters that control the routing of the data plane traffic. For instance, REWS 101 may apply the changes to routers, DNS servers, and/or other traffic management devices of source node 103 that sends and/or receives the data plane traffic.

Figure 4:
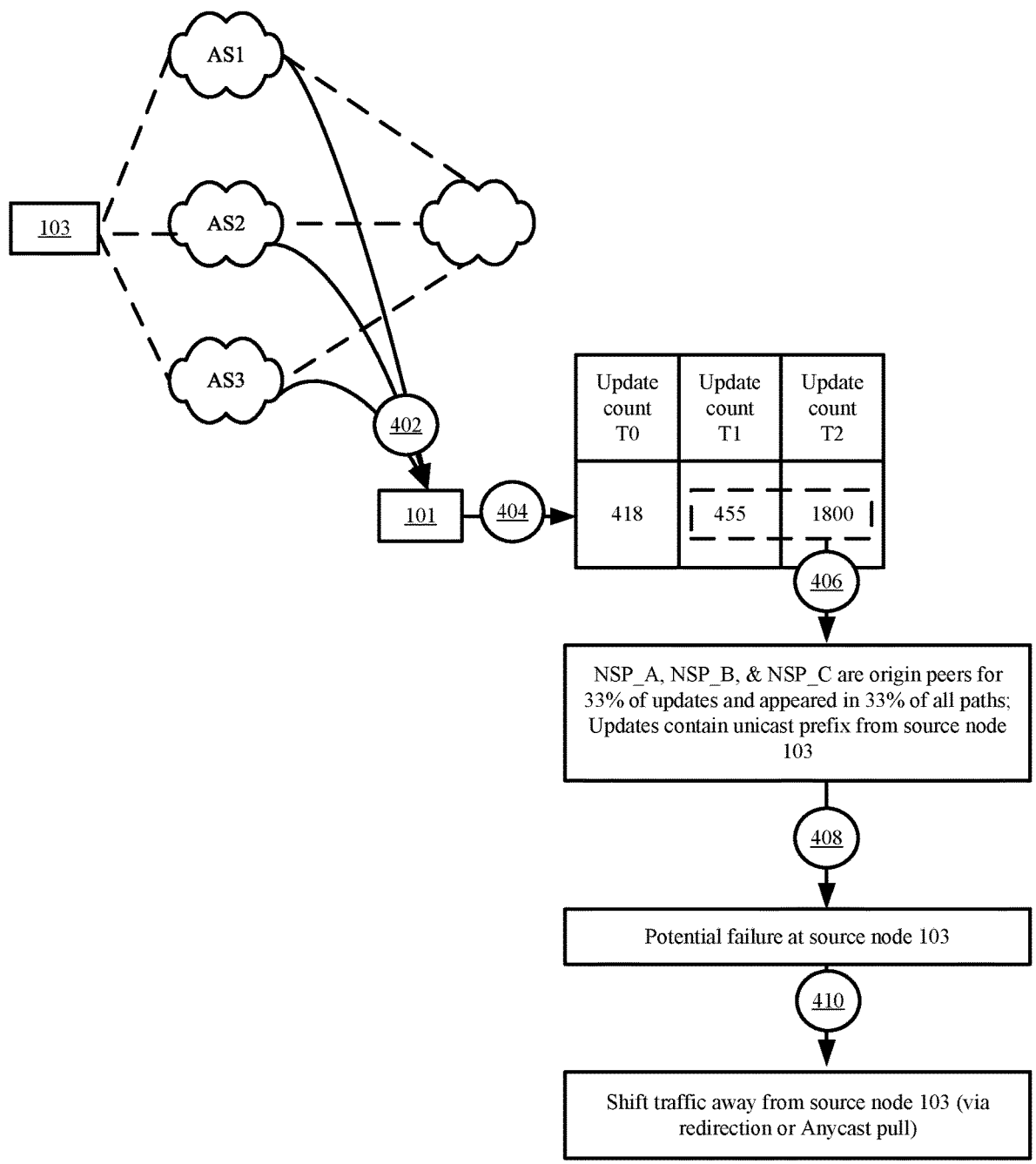
FIG. 4 illustrates an example of isolating a network issue to a monitored source node based on aggregated control plane messages in accordance with some embodiments presented herein.

FIG. 4 illustrates an example of isolating a network issue to a monitored source node based on aggregated control plane messages in accordance with some embodiments presented herein. REWS 101 may receive (at 402) control plane messages from various peers, carriers, ASes, and/or providers, and may model (at 404) the control plane message patterns by grouping the control plane messages based on time.

REWS 101 may detect (at 406) an anomalous spike or increase in the control plane message counts of one or more groups that deviate from the control plane message counts of the other groups, and may inspect the control plane messages from the anomalous groups to isolate (at 408) the root cause for the anomalous behavior or activity. As shown in FIG. 4, REWS 101 may isolate (at 408) the anomalous behavior or activity to a different root cause then the root cause of FIG. 3 by determining that about an equal number of the anomalous control plane messages originate from three different neighboring networks, peers, or ASes that are connected to source node 103, that the three neighboring networks, peers, or ASes appear in about an equal number of the paths, and that the control plane messages contain a unicast prefix that is associated with source node 103. In this example, each of the three different neighboring networks, peers, or ASes update their routing tables in response to a change, condition, or event that affects the network reachability of source node 103. In other words, the change, condition, or event that affects the network reachability of source node 103 has caused all paths of peers connected to source node 103 to update within a similar time frame. Accordingly, from this analysis, REWS 101 may isolate (at 408) the anomalous behavior to source node 103, and may further predict, with a high probability, that a potential failure may or has occurred at source node 103.

REWS 101 may implement (at 410) corrective action to redirect or route some or all the traffic intended for source node 103 to an alternate site or alternate node where the same content, services, and/or data may be accessed. For instance, REWS 101 may initiating a withdrawal or pull of the Anycast address originating from source node 103 so that the routing tables of neighboring networks, peers, or ASes adjust to identify a route to the next closest alternate site or alternate node advertising that same Anycast address. In some such embodiments, REWS 101 may modify operation of routers, DNS servers, and/or other traffic management devices of source node 103 in order to withdraw or pull the Anycast addressing. In some other embodiments, REWS 101 may use other traffic engineering techniques and/or implement other changes in the routers of source node 103 and/or neighboring networks, peers, or ASes in order to redirect traffic away from source node 103 to the alternate site or alternate node. Once the traffic has been shifted away from source node 103, the routers causing the detected network issues may be examined, reset, reconfigured, replaced, repaired, and/or left alone until the issue is resolved.

Figure 5:
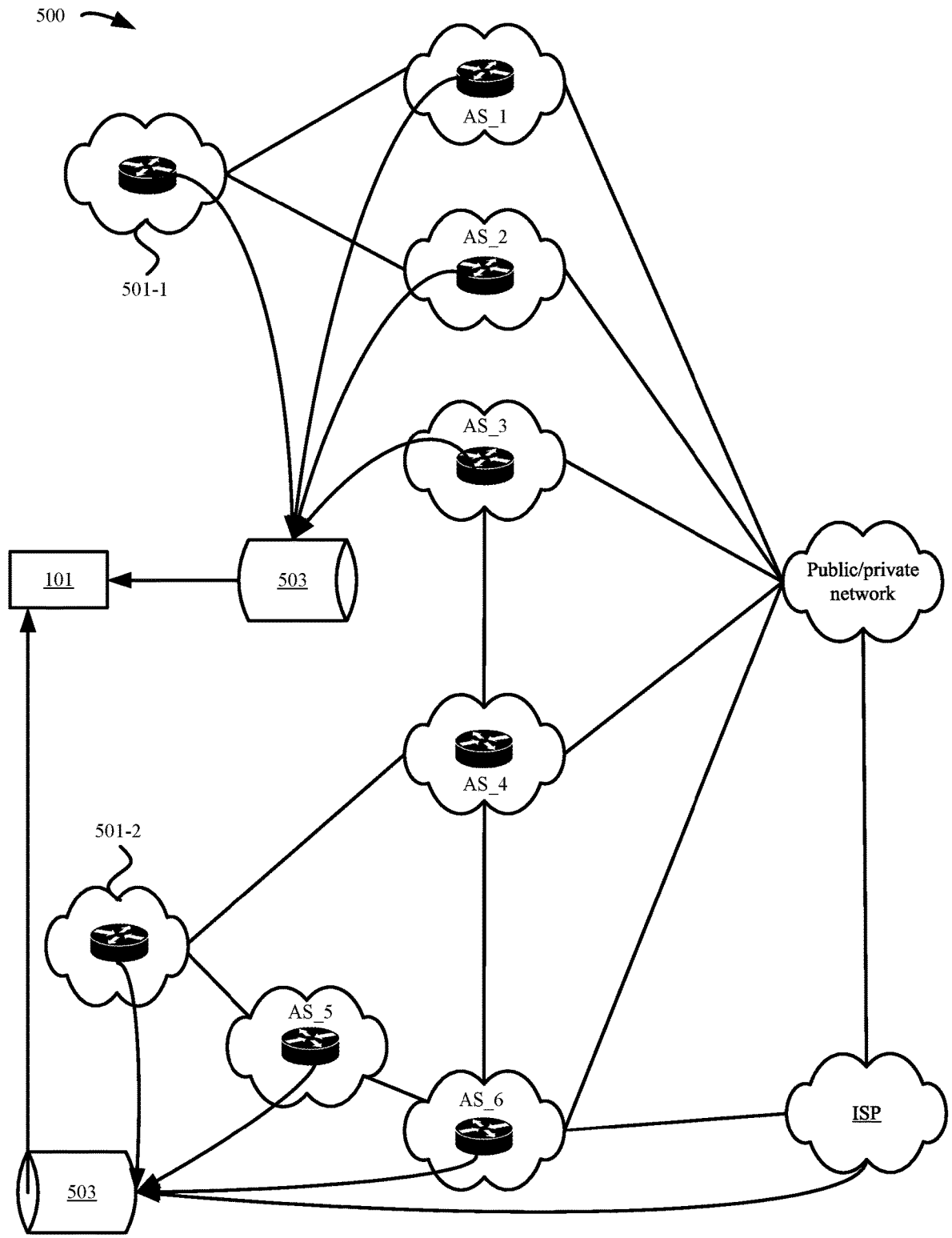
FIG. 5 illustrates an example architecture for the preemptive detection and correction of network issues based on the modeling of inter-domain control plane messages in accordance with some embodiments presented herein.

FIG. 5 illustrates example architecture 500 for the preemptive detection and correction of network issues based on the modeling of inter-domain control plane messages in accordance with some embodiments presented herein. In architecture 500, REWS 101 may be used to preemptively detect and correct network issues that may impact the routing of data plane traffic to and from different PoPs 501-1 and 501-2 (herein sometimes collectively referred to as "PoPs 501", or individually referred to as "PoP 501"). PoPs 501 may be operated by the same CDN or distributed platform.

Each PoP 501 may host and/or distribute a similar set of content, services, or data to user equipment ("UEs"), sites, networks, and/or nodes in regions that are geographically proximate to those PoPs 501. Each PoP 501 may advertise the same Anycast address, and may rely on network routing protocols to route user requests specifying the Anycast address to whichever PoP 501 is closest to the requesting user. The CDN or distributed platform may peer with multiple carriers, ASes, ISPs, and/or other transit providers in order to provide redundant or alternate network paths with which the UEs, sites, networks, and/or nodes may access PoPs 501 and/or exchange network traffic with PoPs 501. In some embodiments, the redundant or alternative network paths may provide different sets of circuits, links, or network hops that connect each PoP 501 to a larger public network (e.g., the Internet) or to specific private networks (e.g., local area networks ("LANs")).

Architecture 500 may include collectors 503. Collectors 503 may be distributed across the network, and may establish BGP sessions with the network equipment of one or more of the transit carriers, ASes, ISPs, and/or other transit providers in order to receive and collect BGP announcements and/or other control plane messages from the network equipment. Collectors 503 may include Routing Information Service ("RIS") devices, Route Views servers, and/or other devices that compile global routing information from different network perspectives. REWS 101 may request and receive the routing information (e.g., BGP announcements and route update messages) from collectors 503 using BGPStream tools, Reseaux IP Europeens ("RIPE") RIS tools, application programming interfaces ("APIs"), and/or other defined interfaces to collectors 503.

REWS 101 may include one or more devices that provide the preemptive detection and correction of network issues for one or more of PoPs 501. Moreover, REWS 101 may resolve network issues that originate within PoPs 501 or outside PoPs 501 on the paths of the carriers through which the PoP traffic is routed.

Figure 6:
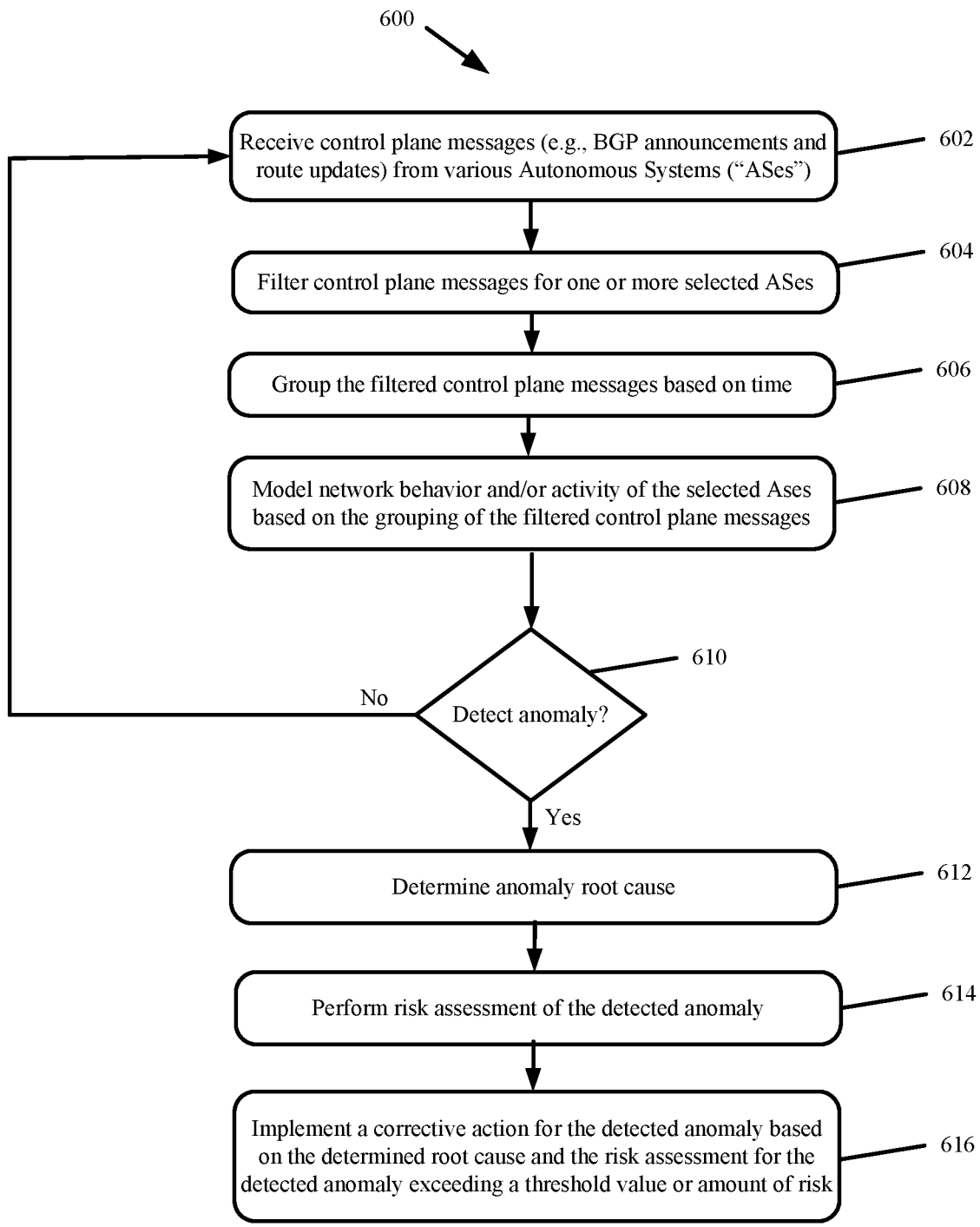
FIG. 6 presents a process for performing the preemptive detection and correction of network issues based on the inter-domain control plane messaging in accordance with some embodiments presented herein.

FIG. 6 presents a process 600 for performing the preemptive detection and correction of network issues based on the inter-domain control plane messaging in accordance with some embodiments presented herein. Process 600 may be implemented by REWS 101 for one or more source PoPs, sites, and/or nodes. In particular, REWS 101 may be configured with the network addressing of the source PoPs, sites, and/or nodes, and REWS 101 may use the addressing to monitor and protect the control plane traffic flowing to and from the source PoPs, sites, and/or nodes over different network paths.

Process 600 may include receiving (at 602) control plane messaging that are generated by different peers, carriers, ASes, and/or providers. The control plane messages may include BGP announcements or route updates that are issued by routers and/or other network equipment of the different peers, carriers, ASes, and/or providers. Receiving (at 602) the control plane messaging may include obtaining the control plane messaging from various network collectors, or establishing sessions and receiving the announcements directly from the network equipment that issues those control plane messages.

Process 600 may include filtering (at 604) the control plane messaging. REWS 101 may filter (at 604) the control plane messaging to exclude the messages for paths connected to non-source PoPs, sites, and/or nodes (e.g., destinations that are not monitored and protected by REWS 101), and to retain the messages for paths connected to the source PoPs, sites, and/or nodes (e.g., destinations that are not monitored and protected by REWS 101). REWS 101 may filter (at 604) the control plane messages based on the address prefixes, origin AS, and/or AS paths specified within the messages.

Process 600 may include grouping (at 606) the filtered control plane messages. In some embodiments, REWS 101 may group (at 606) the filtered control plane messages in different time buckets or time bins. Control plane messages that originated or were received within a particular time interval may be placed into a common group. In some embodiments, REWS 101 may maintain a sliding window of the count of the filtered control messages seen in the last w bins, allowing it to avoid storing information about updates more than w bins old. In some embodiments, the grouping (at 606) may include partitioning or arranging the control plane messages in the different time buckets or time bins by the origin peer. For instance, the filtered control plane messages arriving during a common time interval and that specify the same origin adjacent network objects in the paths may be grouped together.

Process 600 may include modeling (at 608) the network behavior and/or activity of the monitored peers, carriers, ASes, and/or providers based on the grouping (at 606) of the filtered control plane messages. The modeling (at 608) may include determining a pattern of control plane messages that represents a steady state. The steady state may represent the average number of control plane messages that are issued by various routers or network equipment when one or more monitored paths are not undergoing changes, are routing traffic with an expected level of performance, and/or are not experiencing issues or failures of any kind. In particular, the modeling (at 608) may include determining the average number or normal range of control messages that originate from a peer, carrier, AS, and/or another provider or that contain a particular path. REWS 101 may generate different models for different peers, carriers, ASes, providers, and/or paths based on different numbers or ranges of control plane messages that repeat for the different peers, carriers, ASes, providers, and/or paths in their respective steady states. For instance, a first set of ASes or paths may be larger than a second set of ASes or paths such that the normal number of control plane messages modeled for the steady state of the first set of ASes or paths is expected to be greater than the normal number of control plane messages modeled for the steady state of the second set of ASes or paths.

Process 600 may include detecting (at 610) normal or abnormal patterns in the modeling. A normal pattern may represent an expected count of control plane messages for a particular path or provider that is in a steady state, and/or a count of control plane messages for a current interval of a particular group that does not deviate from the count of control plane messages from one or more previous intervals of the particular group by a specified threshold or percentage. An abnormal pattern may represent an anomaly in the modeling. The anomaly may occur when there is a sudden increase or spike of control plane messages in one or more of the filtered groups, or when the count for a particular group exceeds an average count or prior counts for that particular group by a specified threshold or percentage. The increase or spike of control plane messages may represent a change or update to one of the monitored paths.

In some embodiments, REWS 101 may detect (at 610) the normal or abnormal patterns using more sophisticated analytic techniques. For instance, once REWS 101 has built a history of w bins and the w+1 bin is complete, REWS 101 may consider the count of bin w+1 relative to those in one or more previous bins. While there are a number of potential anomaly detection mechanisms that could be used (e.g., modified z-score and estimates of the standard deviation, static thresholds, various change detection techniques), REWS 101 may employ a density-based detection mechanism to detect an anomaly between bin w+1 and the prior bins.

To perform density-based anomaly detection, REWS 101 may consider a radius R and a neighbor count k. New time bin w+1 may be an outlier if there are fewer than k other bins in the last w minutes which have counts within radius R centered around the count of the new bin.

Process 600 may include receiving (at 602), filtering (at 604), grouping (at 606), and/or modeling (at 608) new control plane messages as they are issued and/or made available at the various network collectors in response to detecting (at 610—No) normal patterns in the modeling (e.g., no anomalies between the current bin w+1 and one or more previous bins). In so doing, process 600 may maintain a real-time or current condition of the source nodes of interest and/or paths connected to the source nodes of interest.

Process 600 may include determining (at 612) a root cause of the anomaly in response to detecting (at 610—Yes) abnormal patterns in the modeling. Determining (at 612) the root cause may include classifying the anomaly as a localized event occurring in a specific source node, or as a downstream event occurring along one or more paths connected to the specific source node.

To determine (at 612) the root cause, REWS 101 may inspect the control plane messages within the anomalous group to determine the number of affected paths and/or where the control plane messages originate from. For an anomaly in which the control plane messages contain paths from a single provider, REWS 101 may isolate the root cause of the anomaly to that single provider or another upstream network used by that provider. For instance, the anomaly may be due to an issue that is isolated in a single path or various paths of a single provider, and therefore causes an increase in changes or updates originating from or affecting paths of the single provider. For an anomaly in which the control plane messages contain paths from multiple providers to a particular source node (e.g., updated paths that terminate at the unicast address of the particular source node), REWS 101 may isolate (at 612) the root cause of the anomaly to the particular source node. For instance, the anomaly may be due to an issue that makes the particular source site unreachable, and therefore causes all paths to the particular source site to change or update.

Process 600 may include performing (at 614) a risk assessment of the detected anomaly. Performing (at 614) the risk assessment may include calculating the probability that the anomaly will impact the flow of data plane traffic based on a variety of parameters such as whether the anomaly repeats or persists for additional intervals or whether the anomaly affects paths that carry large amounts of data plane traffic or insignificant amounts of data plane traffic.

In some embodiments, REWS 101 may calculate the risk associated with a particular anomaly by multiplying the fraction of the particular anomaly's control plane messages from an origin peer with the fraction of bytes carried by that peer both to and from the monitored source node. If the anomaly is dominated with control plane messages with a path that traverses a peer with significant traffic, the weighted value will be high, representing high risk. On the other hand, if the anomaly features few control plane messages from such a peer, it will receive a low risk.

In some embodiments, the risk assessment may be based on the definition of an abstraction that is referred to as the path chain. The path chain may be a subsequence of paths that occurs in at least s % of an anomaly's control plane messages, for some value of s, beginning at the source node. Shorter path chains may indicate that the root cause for an anomaly occurred near or at the source node, whereas longer path chains may indicate the root cause in intermediate providers. The length of the path chain may be used to estimate the likelihood that a particular anomaly may have end-user impact.

In some embodiments, the risk assessment may be used to differentiate between changes or updates that result from intentional acts of network administrators, or that result from unexpected or unintended events. For instance, an anomaly that is due to a network administrator resetting a router or manually changing a path may result in an insignificant data plane disruption that resolves itself after a short period of time. The risk assessment should classify such an anomaly as low risk and one that does not require corrective action. Conversely, an anomaly that occurs without action by a network administrator may be caused by an unforeseen failure or misconfiguration that can snowball and result in long term disruption of the data plane. The risk assessment should classify such an anomaly as high risk and one that does require corrective action.

In some embodiments, the risk assessment may be based on the past reliability of a provider. For instance, an anomaly detected for a first provider whose paths have 99.5% reliability may be given a higher risk score than an anomaly detected for a second provider whose paths have lower reliability and experienced a higher frequency of interruptions in the past. The second provider may offer the best reliability for the region, and it is therefore better to retain the data plane traffic on the paths of the second provider unless the anomaly persists for an extended period of time and/or results in significant data plane interruptions.

In some embodiments, performing (at 614) the risk assessment may include multiplying the fraction of control plane messages for an anomaly from an origin peer with the fraction of bytes carried by that peer both to and from the monitored source node. If the anomaly is dominated with control plane messages with a path that traverses a peer with significant traffic, the weighted value will be high, representing high risk. On the other hand, if the anomaly features few control plane messages from such a peer, it will receive a low risk.

In some embodiments, determining (at 612) the root cause and/or performing (at 614) the risk assessment may include modeling and/or correlating past events to past interruptions on the data plane. For instance, REWS 101 may collect historical router telemetry data to determine if routers at a source node or along one or more network paths experienced any reset events and/or other events that produce certain data plane disruptions. REWS 101 may compare the timing of those reset events to the timing of various fluctuations in the control plane messages to model a correlation between the events and the control plane messages. Additionally, REWS 101 may track the scale of the data plane disruption associated with each event, and may link the impact to each correlated model. REWS 101 may then determine (at 612) the root cause of an anomaly and/or perform (at 614) the risk assessment by comparing the fluctuations from the current anomaly to fluctuations of past events and the data plane interruptions resulting from those past events.

Process 600 may include implementing (at 616) a corrective action for the detected anomaly based on the determined root cause and the risk assessment for the detected anomaly exceeding a threshold value or amount of risk. Implementing (at 616) the corrective action may involve performing traffic engineering to shift data plane traffic from the affected providers, paths, or source nodes to alternate providers, paths, or source nodes where the anomaly has no affect. In some embodiments, implementing (at 616) the corrective action may include adjusting routing policies, routing tables, route advertisements and/or announcements, DNS records, and/or other traffic engineering parameters that control the routing of the data plane traffic to and from the one or more source nodes affected by the detected anomaly. In some embodiments, implementing (at 616) the corrective action may include resetting, reconfiguring, or replacing network equipment responsible for the detected anomaly. REWS 101 may implement (at 616) the corrective action for a temporary period of time until the anomaly dissipates or is resolved. For instance, REWS 101 may shift traffic away from an affected path, and may return the traffic to that path once the number of control plane messages return to a normal or expected level, or the performance of the path returns to the steady state level.

Figure 7:
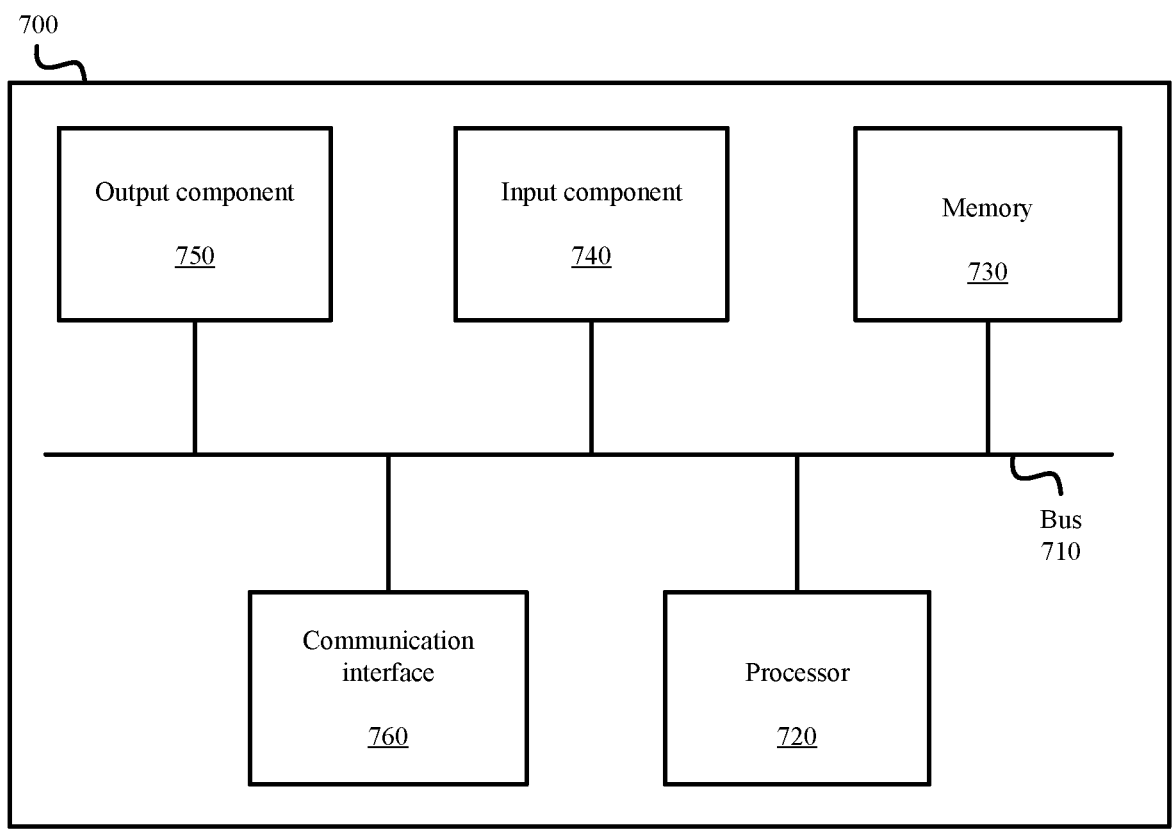
FIG. 7 illustrates example components of one or more devices, according to one or more embodiments described herein.

FIG. 7 is a diagram of example components of device 700. Device 700 may be used to implement one or more of the devices or systems described above (e.g., REWS 101, source node 103, PoPs 501, collectors 503, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes ("LEDs"), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   receiving a plurality of control plane messages for a plurality of paths that connect to a source node;
   grouping the plurality of control plane messages to a plurality of bins based on time, wherein said grouping comprises adding a first set of the plurality of control plane messages to a particular bin of the plurality of bins;
   detecting an anomaly based on a number of the first set of control plane messages grouped to the particular bin differing from a steady state number of control plane messages grouped to at least one other bin of the plurality of bins by a threshold amount;
   isolating a cause of the anomaly based on which one or more paths from the plurality of paths are updated in the first set of control plane messages and the first set of control plane messages comprising addressing of one or more nodes including the source node; and
   modifying routing of data plane traffic of the source node in response to detecting the anomaly and isolating the cause of the anomaly.

2. The method of claim 1, wherein receiving the plurality of control plane messages comprises:
   receiving a first subset of the plurality of control plane messages from one or more routers of a first transit provider; and
   receiving a different second subset of the plurality of control plane messages from one or more routers of a second transit provider.

3. The method of claim 1, wherein receiving the plurality of control plane messages comprises:
   aggregating the plurality of control plane messages from one or more network collectors with established Border Gateway Protocol ("BGP") sessions established with different Autonomous Systems ("ASes").

4. The method of claim 1 further comprising:
   filtering the plurality of control plane messages to retain a first subset of the plurality of control plane messages from a first AS with one or more paths to the source node, and to exclude a second AS with no paths to the source node.

5. The method of claim 1 further comprises:
determining the steady state number of control plane messages from two or more bins of the plurality of bins having a number of control plane messages that are within a specified range.

6. The method of claim 1, wherein the plurality of control plane messages comprise BGP announcements issued by a plurality of routers that serve as network hops for the plurality of paths.

7. The method of claim 1, wherein isolating the cause comprises:
detecting a network issue at the source node based on the first set of control plane messages specifying changes to paths from the plurality of paths that are operated by different providers, and the first set of control plane messages comprising addressing of the source node; and
detecting a network issue at a particular provider based on the first set of control plane messages specifying changes to one or more paths operated by the particular provider, and the first set of control plane messages comprising addressing of a node in addition to or different than the addressing of the source node.

8. The method of claim 1, wherein modifying the routing comprises:
shifting the data plane traffic from a first path of the plurality of paths to a different second path of the plurality of paths in response to isolating the cause of the anomaly to a downstream event away from the source node; and
shifting the data plane traffic from the source node to an alternate node in response to isolating the cause of the anomaly to the source node.

9. The method of claim 1 further comprising:
performing a risk assessment of the anomaly by calculating a probability that the anomaly impacts flow of the data plane traffic; and
wherein modifying the routing comprises:
shifting the data plane traffic from a current path of the plurality of paths or the source node in response to the probability from the risk assessment exceeding a risk threshold; and
maintaining the data plane traffic on the current path or the source node in response to the probability from the risk assessment not exceeding the risk threshold.

10. The method of claim 1,
wherein detecting the anomaly comprises detecting a potential data plane issue based on the first set of control plane messages; and
wherein modifying the routing comprises implementing a shift of the data plane traffic from a current path of the plurality of paths or the source node prior to a disruption to a flow of the data plane traffic.

11. The method of claim 1, modifying the routing comprises:
changing one or more of a routing table or a routing policy of a router at the source node.

12. The method of claim 1, modifying the routing comprises:
redirecting the data plane traffic from a current path of the plurality of paths to a different path of the plurality of paths, or from the source node to an alternate node.

13. A system comprising:
one or more processors configured to:
receive a plurality of control plane messages for a plurality of paths that connect to a source node;
group the plurality of control plane messages to a plurality of bins based on time, wherein said grouping comprises adding a first set of the plurality of control plane messages to a particular bin of the plurality of bins;
detect an anomaly based on a number of the first set of control plane messages grouped to the particular bin differing from a steady state number of control plane messages grouped to at least one other bin of the plurality of bins by a threshold amount;
isolate a cause of the anomaly based on which one or more paths from the plurality of paths are updated in the first set of control plane messages and the first set of control plane messages comprising addressing of one or more nodes including the source node; and
modify routing of data plane traffic of the source node in response to detecting the anomaly and isolating the cause of the anomaly.

14. The system of claim 13, wherein the one or more processors are further configured to:
receive a first subset of the plurality of control plane messages from one or more routers of a first transit provider; and
receive a different second subset of the plurality of control plane messages from one or more routers of a second transit provider.

15. The system of claim 13, wherein the one or more processors are further configured to:
aggregate the plurality of control plane messages from one or more network collectors with established Border Gateway Protocol ("BGP") sessions established with different Autonomous Systems ("ASes").

16. The system of claim 13, wherein the one or more processors are further configured to:
filter the plurality of control plane messages to retain a first subset of the plurality of control plane messages from a first AS with one or more paths to the source node, and to exclude a second AS with no paths to the source node.

17. The system of claim 13, wherein isolating the cause comprises:
detecting a network issue at the source node based on the first set of control plane messages specifying changes to paths from the plurality of paths that are operated by different providers, and the first set of control plane messages comprising addressing of the source node; and
detecting a network issue at a particular provider based on the first set of control messages specifying changes to one or more paths operated by the particular provider, and the first set of control plane messages comprising addressing of a node in addition to or different than the addressing of the source node.

18. The system of claim 13, wherein modifying the routing comprises:
shifting the data plane traffic from a first path of the plurality of paths to a different second path of the plurality of paths in response to isolating the cause of the anomaly to a downstream event away from the source node; and
shifting the data plane traffic from the source node to an alternate node in response to isolating the cause of the anomaly to the source node.

19. The system of claim 13, wherein the one or more processors are further configured to:

perform a risk assessment of the anomaly by calculating a probability that the anomaly impacts flow of the data plane traffic; and wherein modifying the routing comprises:
shifting the data plane traffic from a current path of the plurality of paths or the source node in response to the probability from the risk assessment exceeding a risk threshold; and maintaining the data plane traffic on the current path or the source node in response to the probability from the risk assessment not exceeding the risk threshold.

20. A non-transitory computer-readable medium, storing a plurality of processor-executable instructions to:

receive a plurality of control plane messages for a plurality of paths that connect to a source node;

group the plurality of control plane messages to a plurality of bins based on time, wherein said grouping comprises adding a first set of the plurality of control plane messages to a particular bin of the plurality of bins;

detect an anomaly based on a number of the first set of control plane messages grouped to the particular bin differing from a steady state number of control plane messages grouped to at least one other bin of the plurality of bins by a threshold amount;

isolate a cause of the anomaly based on which one or more paths from the plurality of paths are updated in the first set of control plane messages and the first set of control plane messages comprising addressing of one or more nodes including the source node; and modify routing of data plane traffic of the source node in response to detecting the anomaly and isolating the cause of the anomaly.

* * * * *